US012701054B2

(12) United States Patent
Mermoud et al.

(10) Patent No.: US 12,701,054 B2
(45) Date of Patent: Aug. 4, 2026

(54) TEACHING LLM-BASED AGENTS TO TROUBLESHOOT NETWORKS USING REINFORCEMENT LEARNING

(71) Applicant: Cisco Technology, Inc., San Jose, CA (US)

(72) Inventors: Grégory Mermoud, Venthône (CH); Pierre-André Savalle, Rueil-Malmaison (FR); Grégoire Magendie, Lamorlaye (FR); Jean-Philippe Vasseur, Combloux (FR); Eduard Schornig, Haarlem (NL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/388,242

(22) Filed: Nov. 9, 2023

(65) Prior Publication Data

US 2025/0158895 A1    May 15, 2025

(51) Int. Cl.
*H04L 41/16* (2022.01)
*H04L 41/22* (2022.01)

(52) U.S. Cl.
CPC .............. *H04L 41/16* (2013.01); *H04L 41/22* (2013.01)

(58) Field of Classification Search
CPC ................................ H04L 41/16; H04L 41/22
See application file for complete search history.

(56) References Cited

U.S. PATENT DOCUMENTS

| 7,620,848 B1 | 11/2009 | Tanner |
| 9,767,263 B1 | 9/2017 | McInerny et al. |
| 10,963,333 B1 | 3/2021 | Nijim et al. |
| 11,032,124 B1 | 6/2021 | Haddow et al. |
| 11,269,718 B1 | 3/2022 | Chen et al. |
| 11,665,079 B1 | 5/2023 | Zacks et al. |
| 11,893,358 B1 * | 2/2024 | Lakshmikanthan .... G06F 40/30 |
| 2004/0128583 A1 | 7/2004 | Iulo et al. |
| 2006/0224537 A1 | 10/2006 | Gonguet et al. |
| 2008/0168018 A1 | 7/2008 | Rohlfing |
| 2010/0223051 A1 | 9/2010 | Burstein et al. |
| 2015/0341667 A1 | 11/2015 | Liao et al. |

(Continued)

FOREIGN PATENT DOCUMENTS

| CN | 116432730 A | 7/2023 |
| CN | 116800525 A | 9/2023 |

OTHER PUBLICATIONS

Almasan P., et al., "Deep Reinforcement Learning Meets Graph Neural Networks: Exploring a Routing Optimization use Case", arXiv:1910.07421v3 [cs.NI], Oct. 7, 2022, pp. 1-12.

(Continued)

*Primary Examiner* — Umar Cheema
*Assistant Examiner* — Adam A Cooney
(74) *Attorney, Agent, or Firm* — Lee & Hayes, P.C.

(57) ABSTRACT

In one implementation, a device uses a large language model-based agent to complete a task with respect to a computer network. The device makes an evaluation of an action taken by the large language model-based agent to complete the task. The device selects, based in part on the evaluation, a set of allowed actions that the large language model-based agent is allowed to perform to complete the task. The device updates the large language model-based agent with an indication of the set of allowed actions that it is allowed to perform to complete the task.

20 Claims, 16 Drawing Sheets

(56) References Cited

U.S. PATENT DOCUMENTS

| | | | |
|---|---|---|---|
| 2017/0063651 A1 | 3/2017 | Wang et al. | |
| 2017/0366983 A1 | 12/2017 | Gunasekara et al. | |
| 2018/0122363 A1 | 5/2018 | Braz et al. | |
| 2019/0042663 A1 | 2/2019 | Gupta et al. | |
| 2019/0347117 A1* | 11/2019 | Vaughn | G06F 16/5866 |
| 2019/0347326 A1 | 11/2019 | Kozhaya et al. | |
| 2019/0361977 A1 | 11/2019 | Crudele et al. | |
| 2020/0327196 A1 | 10/2020 | Sampat et al. | |
| 2021/0158146 A1* | 5/2021 | Singh | G06N 3/08 |
| 2021/0174240 A1 | 6/2021 | Chakraborti et al. | |
| 2021/0344553 A1 | 11/2021 | Blake et al. | |
| 2022/0006760 A1 | 1/2022 | Lopes De Moraes et al. | |
| 2022/0014426 A1 | 1/2022 | Völksen | |
| 2022/0091957 A1* | 3/2022 | Szczepanik | G06F 11/0778 |
| 2022/0147876 A1 | 5/2022 | Dalli et al. | |
| 2022/0171641 A1* | 6/2022 | Pichiliani | H04L 51/56 |
| 2022/0284059 A1 | 9/2022 | Kalandyk et al. | |
| 2022/0309247 A1 | 9/2022 | Jacob et al. | |
| 2022/0398598 A1* | 12/2022 | Das | G06N 5/01 |
| 2023/0059605 A1* | 2/2023 | Sait M A | G06Q 30/016 |
| 2023/0080724 A1 | 3/2023 | Stoops et al. | |
| 2023/0145448 A1 | 5/2023 | Huber et al. | |
| 2023/0216747 A1 | 7/2023 | Barber et al. | |
| 2023/0237277 A1 | 7/2023 | Reza et al. | |
| 2023/0237352 A1 | 7/2023 | Lan et al. | |
| 2023/0252288 A1 | 8/2023 | Budden et al. | |
| 2023/0259821 A1* | 8/2023 | Travalini | G06N 3/0455 706/12 |
| 2023/0334340 A1 | 10/2023 | Neal, Jr. et al. | |
| 2024/0015076 A1 | 1/2024 | Donthireddy | |
| 2024/0054566 A1 | 2/2024 | Pattillo et al. | |
| 2024/0102677 A1 | 3/2024 | Aschow et al. | |
| 2024/0143737 A1 | 5/2024 | Zamir et al. | |
| 2024/0202062 A1 | 6/2024 | Coady et al. | |
| 2024/0211694 A1* | 6/2024 | Pan | G06N 5/022 |
| 2024/0283806 A1 | 8/2024 | Gibson et al. | |
| 2024/0345913 A1 | 10/2024 | Bethamsetty et al. | |
| 2024/0378395 A1 | 11/2024 | Sommers et al. | |
| 2024/0412720 A1* | 12/2024 | Vasylyev | G06F 16/90332 |
| 2025/0028759 A1* | 1/2025 | Castillo | G06F 16/838 |
| 2025/0029110 A1* | 1/2025 | Wooters | G06Q 30/015 |
| 2025/0117757 A1* | 4/2025 | Butterworth | G06Q 10/20 |
| 2025/0132968 A1 | 4/2025 | Mermoud et al. | |
| 2025/0150377 A1 | 5/2025 | Vasseur et al. | |
| 2026/0004082 A1 | 1/2026 | Rupe et al. | |

OTHER PUBLICATIONS

Hennings M., "What is a Prompt Injection Attack (and How to Prevent It)", Entry Point, Aug. 13, 2023, pp. 1-6.

Keary T., "Prompt Injection Attack", TechDictionary, Sep. 12, 2023, pp. 1-11.

Mirchandani S., et al., "Large Language Models as General Pattern Machines", arXiv:2307.04721v2 [cs.AI], Oct. 26, 2023, pp. 1-21.

Mnih V., et al., "Human-level Control Through Deep Reinforcement Learning", Letter Research, Nature, vol. 518, Feb. 26, 2015, 13 Pages.

Silver D., et al., "Mastering the Game of Go Without Human Knowledge", Nature, vol. 550, Oct. 19, 2017, pp. 1-42.

Zhu H., et al., "Network Planning with Deep Reinforcement Learning", ACM SIGCOMM 2021 Conference, Aug. 23-28, 2021, Virtual Event, Netherlands, pp. 258-271.

* cited by examiner

310

REGIONAL HUB 304

ISP 3 306d

SaaS PROVIDER 308

ISP 2 306b

MPLS 306c

ISP 1 306a

Int 1

Int 2

Int 3

110

REMOTE SITE 302

600

```
def get_top_colors_by_bytes_d851ce3057(last_n_hours: int, user_ip: str,
application: str) -> str:
    """Get the top 10 colors by number of bytes for all WAN circuits used by the
specified
    application for the specified user IP in the last N hours.
    Domain: vmanage
    Parameters:
    - last_n_hours (int): number of hours to look back
    - user_ip (str): user IP address
    - application (str): application name
    """

data = client.vmanage.metrics.colors_by_user_and_application(
        last_n_hours=last_n_hours, user_ip=user_ip, application=application
    )
    df = pd.json_normalize(data)
    observation = df.sort_values (by="octets", ascending=False).head(10)
    observation_str = observation.to_markdown()
    return f"In the last {last_n_hours} hours, the top 10 colors by number of
bytes for all WAN circuits used by the application {application} for the user
IP {user_ip} are:\n{observation_str}"
```

FIG. 6

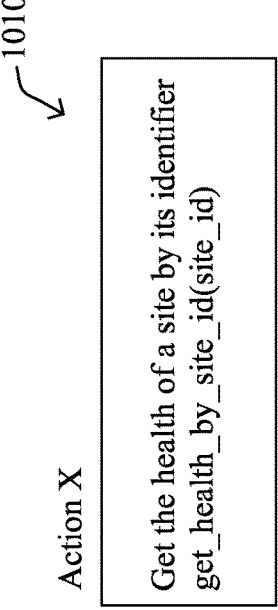

1010

Action X

Get the health of a site by its identifier
get_health_by_site_id(site_id)

State (prompt)

Question: What is Chiara's experience?
Observations:
- Chiara has user IP 1.2.3.4
- Chiara is located in site 3.

Describe your next step:

→ LLM → Prob(Action X | State)

Evaluate probability of each token

Prob(Action X | State) = P(3855 | State) · P(262 | State, 3855),
P(1535 | State, 3855, 262) · ... · P(198 | State, 3855,...,8)

Tokenize Action X
Get the health of a site by its identifier
get_health_by_site_id(site_id)

TEACHING LLM-BASED AGENTS TO TROUBLESHOOT NETWORKS USING REINFORCEMENT LEARNING

TECHNICAL FIELD

The present disclosure relates generally to teaching large language model (LLM)-based agents to troubleshoot networks using reinforcement learning.

BACKGROUND

The recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc. In addition, agents can be written to perform complex tasks by chaining multiple calls to one or more LLMs.

The easiest way to build an LLM-based troubleshooting agent to perform a complex task, such as troubleshooting a computer network, would be to utilize the zero-shot capabilities of the model (or few-shot using some examples in the prompt). For instance, one might prompt GPT-4 with some description of the problem and some instruction(s) to solve the problem. More elaborate approaches might include allowing the model to write code to fetch data through controller application programming interfaces (APIs) (e.g., DNA Center, vManage, Intersight, etc.) and then form an answer based on this extra data. In such a case, one must provide some form of API documentation to the model through retrieval-augmented generation (RAG), by fetching relevant documents from a vector database and including them in the prompt.

However, these approaches are limited in that they do not learn from past experiences: whether they fail or succeed in solving a user request, they will have the same likelihood of succeeding on a similar question. In addition, they require very capable (and therefore very large) models: because they rely on zero-shot capabilities, they require models with strong reasoning and coding abilities.

BRIEF DESCRIPTION OF THE DRAWINGS

The implementations herein may be better understood by referring to the following description in conjunction with the accompanying drawings in which like reference numerals indicate identically or functionally similar elements, of which:

FIG. 6 illustrates an example action definition;

FIGS. 10A-10D illustrate example policy strategies; and

DESCRIPTION OF EXAMPLE IMPLEMENTATIONS

Overview

Figure 1A:
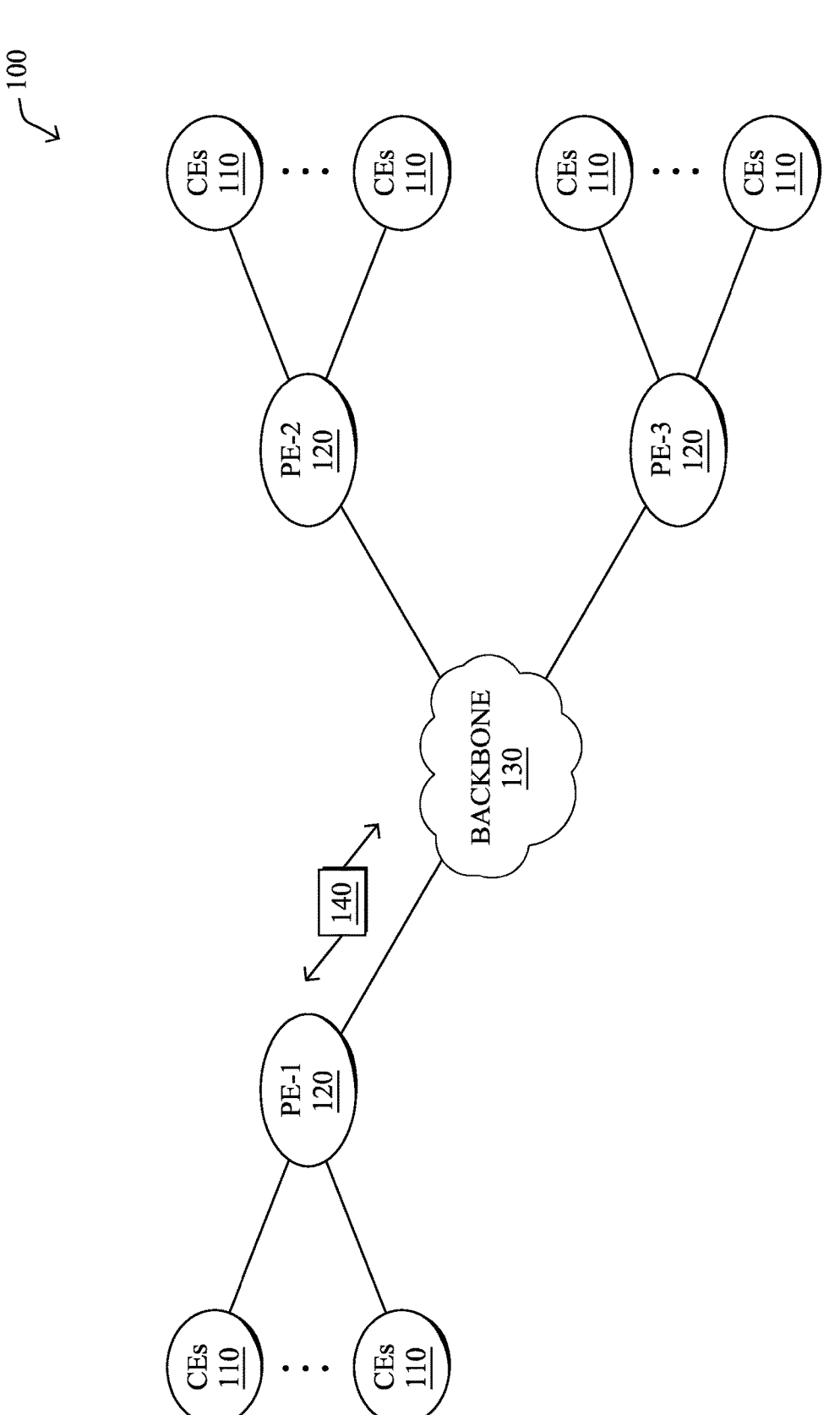
FIGS. 1A-1B illustrate an example communication network.

According to one or more implementations of the disclosure, a device uses a large language model-based agent to complete a task with respect to a computer network. The device makes an evaluation of an action taken by the large language model-based agent to complete the task. The device selects, based in part on the evaluation, a set of allowed actions that the large language model-based agent is allowed to perform to complete the task. The device updates the large language model-based agent with an indication of the set of allowed actions that it is allowed to perform to complete the task.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
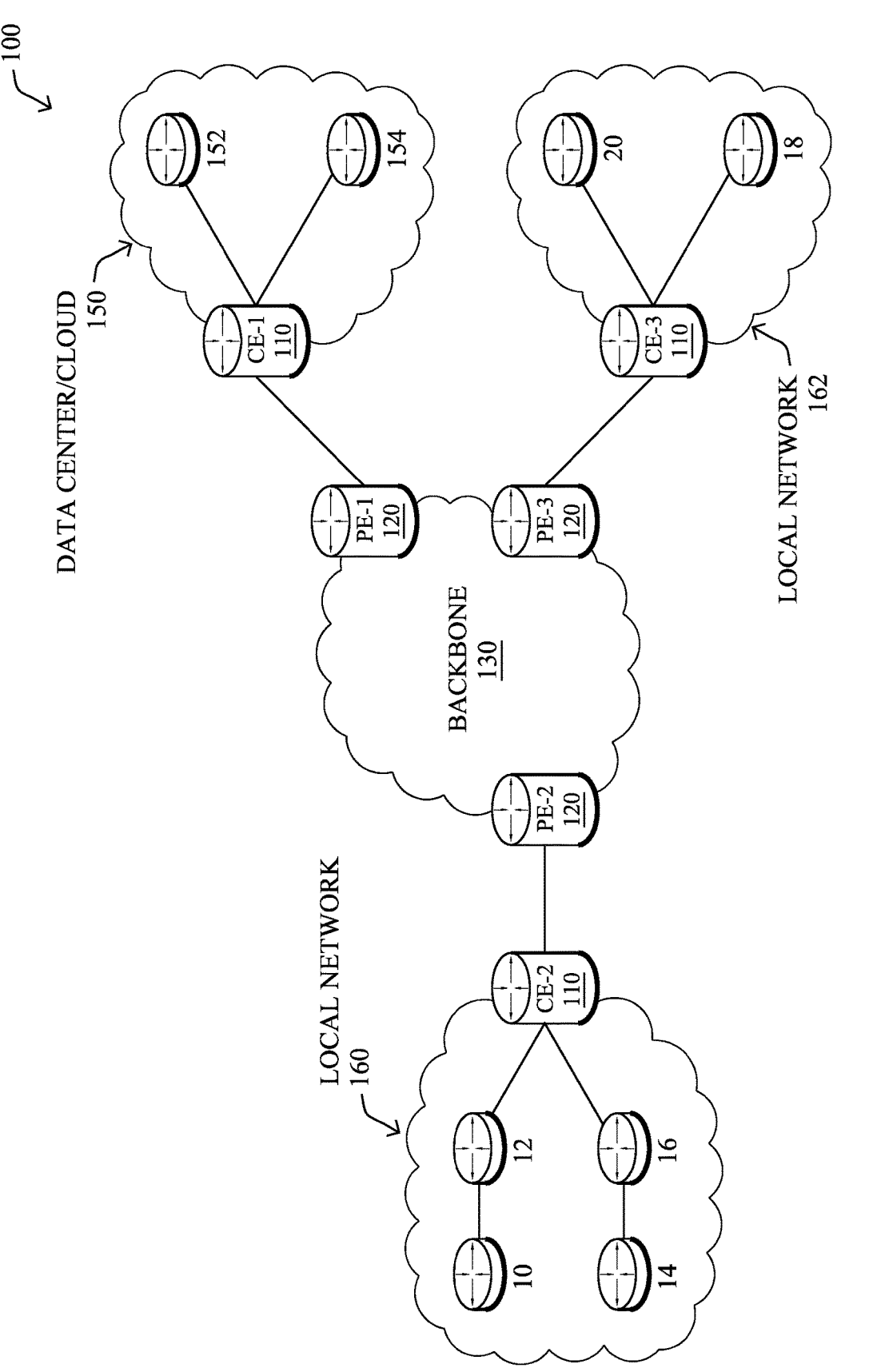

FIG. 1B illustrates an example of network 100 in greater detail, according to various implementations. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
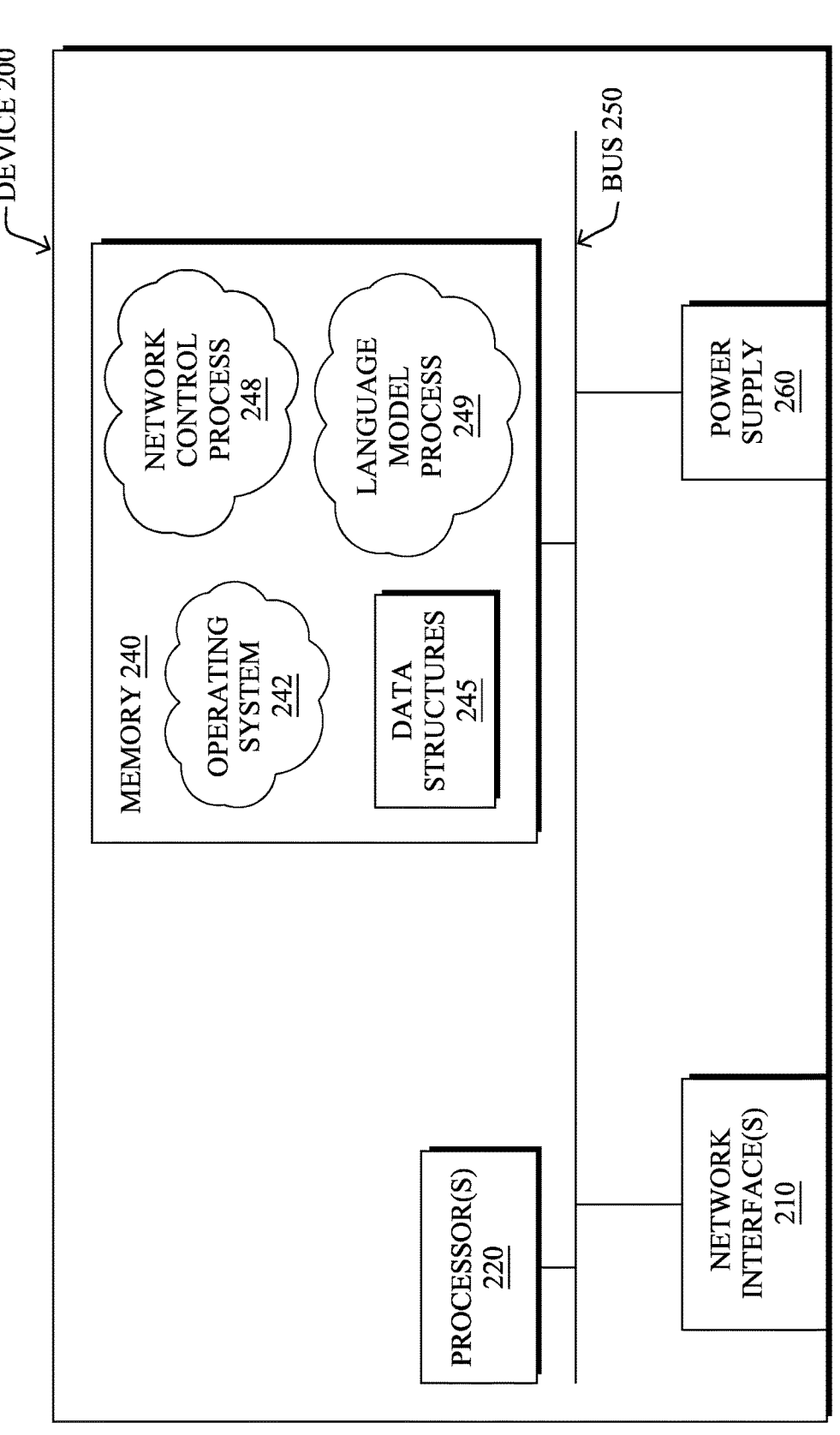
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software components may comprise a network control process 248 and/or a language model process 249 as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In some instances, network control process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, network control process 248 may consist solely of providing mechanisms necessary for source routing techniques. That is, for source routing, other devices in the network can tell the less capable devices exactly where to send the packets, and the less capable devices simply forward the packets as directed.

In various implementations, as detailed further below, network control process 248 and/or language model process 249 may include computer executable instructions that, when executed by processor(s) 220, cause device 200 to perform the techniques described herein. To do so, in some implementations, network control process 248 and/or language model process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+ b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, network control process 248 and/or language model process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that network control process 248 and/or language model process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, network control process 248 and/or language model process 249 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, network control process 248 may use a generative model to generate synthetic network traffic based on existing user traffic to test how the network reacts. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
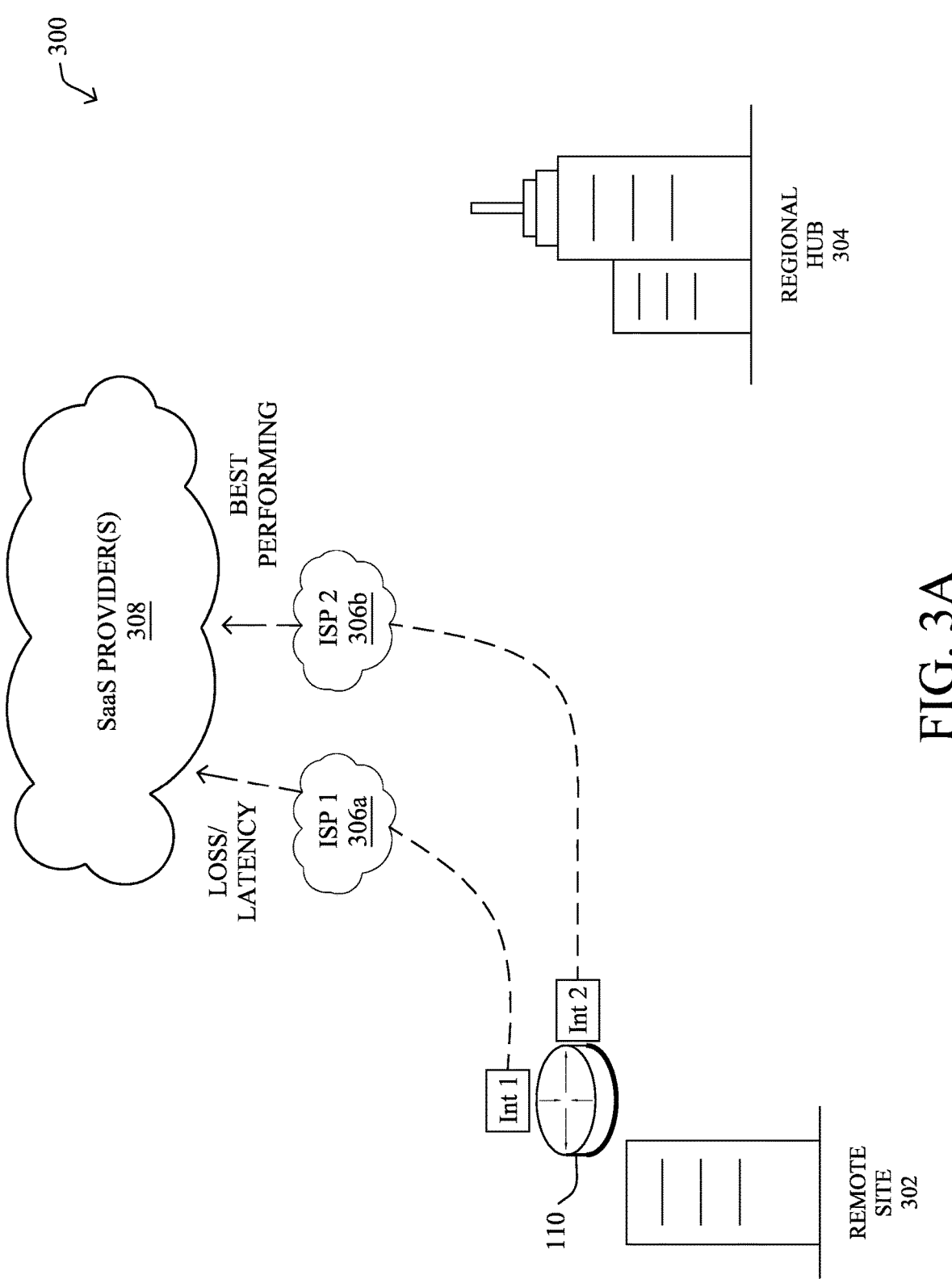
FIGS. 3A-3B illustrate example network deployments.
Figure 3B:

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4:
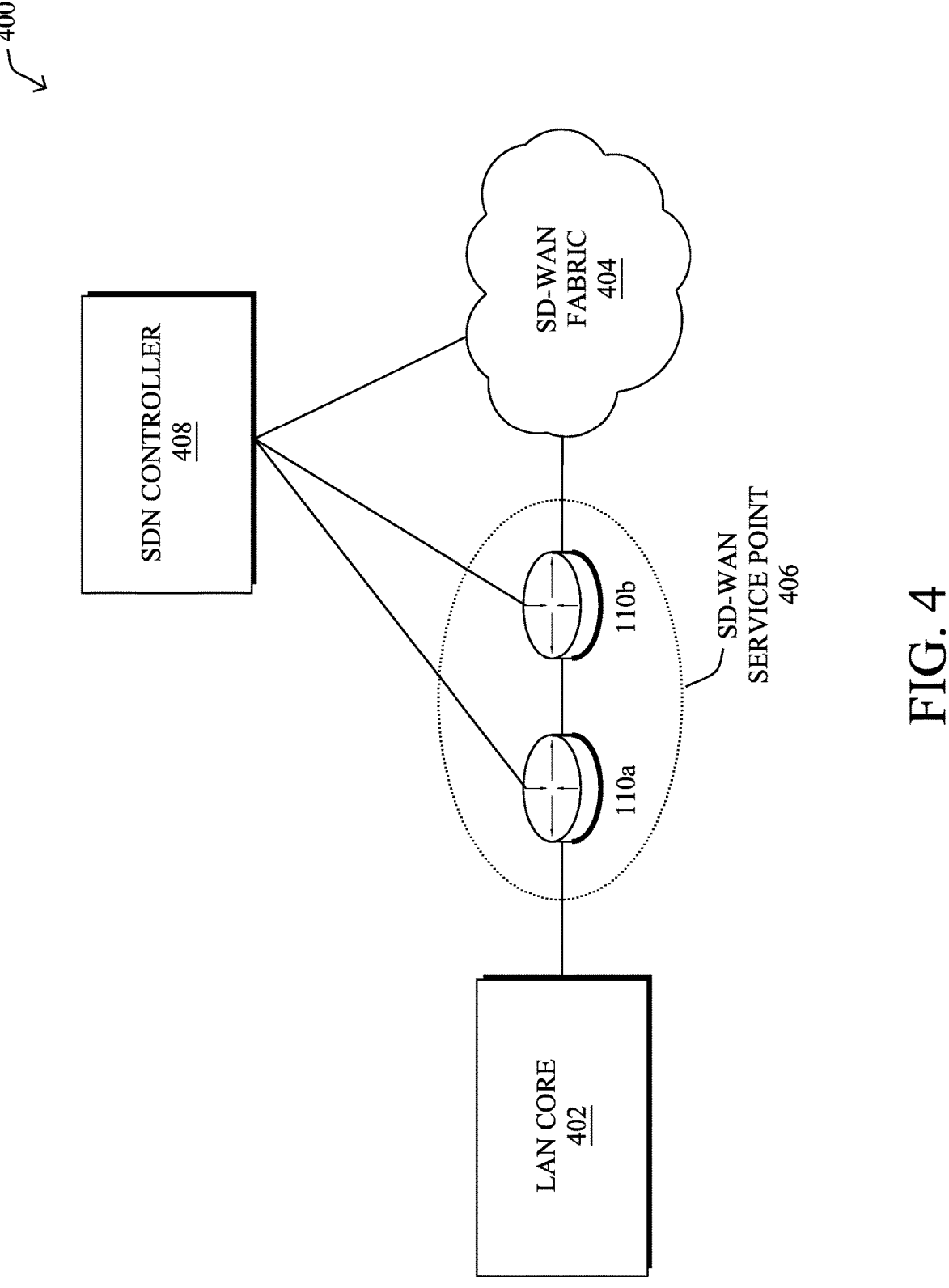
FIG. 4 illustrates an example software defined network (SDN) implementation.

FIG. 4 illustrates an example SDN implementation 400, according to various implementations. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service (e.g., through execution of network control process 248), typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various implementations, SDN controller 408 may employ application aware routing, which refers to the ability to route traffic so as to satisfy the requirements of the application, as opposed to exclusively relying on the (constrained) shortest path to reach a destination IP address. For instance, SDN controller 408 may make use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, SDN controller 408 may compute a variety of models to understand application requirements, and predictably route traffic over private networks and/or the Internet, thus optimizing the application experience while drastically reducing SLA failures and downtimes.

In other words, SDN controller 408 may first predict SLA violations in the network that could affect the QoE of an application (e.g., due to spikes of packet loss or delay, sudden decreases in bandwidth, etc.). In other words, SDN controller 408 may use SLA violations as a proxy for actual QoE information (e.g., ratings by users of an online application regarding their perception of the application), unless such QoE information is available from the provider of the online application. In turn, SDN controller 408 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one implementation. In general, routing configuration changes are also referred to herein as routing "patches," which are typically temporary in nature (e.g., active for a specified period of time) and may also be application-specific (e.g., for traffic of one or more specified applications).

As noted above, the recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc.

In the specific context of computer networks, though, network troubleshooting and monitoring are traditionally complex tasks that rely on engineers analyzing telemetry data, configurations, logs, and events across a diverse array of network devices encompassing access points, firewalls, routers, and switches managed by various types of network controllers (e.g., SD-WAN, DNAC, ACI, etc.). Moreover, network issues can manifest in various forms, stemming from a multitude of factors, each with its own level of complexity.

The easiest way to build an LLM-based network troubleshooting agent would be to utilize the zero-shot capabilities of the model (or few-shot using some examples in the prompt). For instance, one might prompt GPT-4 with some description of the problem and some instruction(s) to solve the problem. More elaborate approaches might include allowing the model to write code to fetch data through controller application programming interfaces (APIs) (e.g., DNA Center, vManage, Intersight, etc.) and then form an answer based on this extra data. In such a case, one must provide some form of API documentation to the model through retrieval-augmented generation (RAG), by fetching relevant documents from a vector database and including them in the prompt.

However, these approaches are limited in that they do not learn from past experiences: whether they fail or succeed in solving a user request, they will have the same likelihood of succeeding on a similar question. In addition, they require very capable (and therefore very large) models: because they rely on zero-shot capabilities, they require models with strong reasoning and coding abilities.

—Teaching LLM-based Agents to Troubleshoot Networks Using Reinforcement Learning—

The techniques herein introduce an architecture that addresses the above challenges through the use of reinforcement learning, whereby an LLM-based agent is trained to take actions in a rich environment whereby a vast number of actions can be taken to maximize a notion of cumulative reward. More specifically, the architecture herein allows the agent to learn to interact with a network, to identify the root cause of an issue in the network and ultimately solve that issue.

Illustratively, the techniques described herein may be performed by hardware, software, and/or firmware, such as in accordance with language model process 249, which may include computer executable instructions executed by the processor 220 (or independent processor of interfaces 210) to perform functions relating to the techniques described herein, such as in conjunction with network control process 248.

Specifically, according to various implementations, a device uses a large language model-based agent to complete a task with respect to a computer network. The device makes an evaluation of an action taken by the large language model-based agent to complete the task. The device selects, based in part on the evaluation, a set of allowed actions that the large language model-based agent is allowed to perform to complete the task. The device updates the large language model-based agent with an indication of the set of allowed actions that it is allowed to perform to complete the task.

Figure 5:
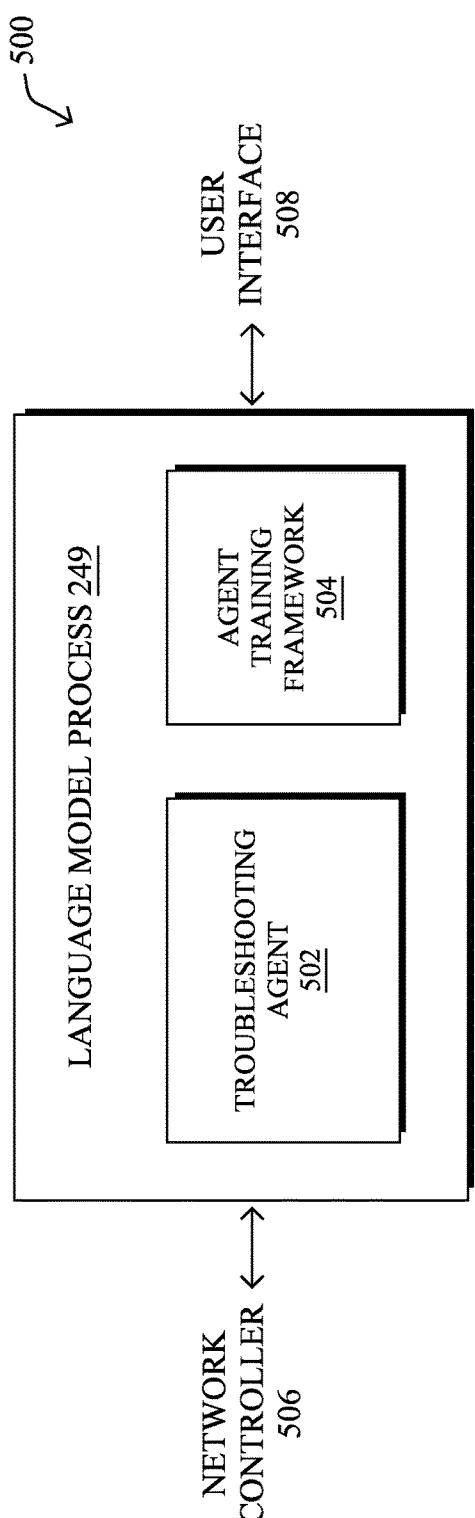
FIG. 5 illustrates an example architecture for teaching a large language model (LLM)-based agent to troubleshoot networks using reinforcement learning.

Operationally, FIG. 5 illustrates an example architecture for teaching an LLM-based agent to troubleshoot networks using reinforcement learning, according to various implementations. At the core of architecture 500 is language model process 249, which may be executed by a controller for a network or another device in communication therewith. For instance, language model process 249 may be executed by a controller for a network (e.g., SDN controller 408 in FIG. 4, a network controller in a different type of network, etc.), a particular networking device in the network (e.g., a router, a firewall, etc.), another device or service in communication therewith, or the like. For instance, as shown, language model process 249 may interface with a network controller 506, either locally or via a network, such as via one or more application programming interfaces (APIs), etc. In addition, language model process 249 may communicate with any number of user interfaces, such as user interface 508.

As shown, language model process 249 may include any or all of the following components: a troubleshooting agent 502 and an agent training framework 504. As would be appreciated, the functionalities of these components may be combined or omitted, as desired. In addition, these components may be implemented on a singular device or in a distributed manner, in which case the combination of executing devices can be viewed as their own singular device for purposes of executing language model process 249.

According to various implementations, troubleshooting agent 502 may leverage one or more LLMs to troubleshoot an issue, find the actual root cause for the issue, and/or suggest a set of one or more actions to fix the issue. Let ai denote an action used for troubleshooting an issue I and let Ai denote an action (configuration change) on the network (closed-loop control). In various instances, issue I may be raised by an end user, a set of users, or detected automatically within the network.

The set of actions Ai required to solve the issue I may be determined on-the-fly by the LLM of troubleshooting agent 502, statically determined according to a cookbook for each trajectory made of a set of action ai, or the like. For example, a static cookbook may be used to map a specific ak to set of actions Ak,l. Consider the action ak="Check the priority queue length of a router," a static set of action ak,l may be used to trigger a set of l action on the network (e.g., "Change the weight of the priority queue," "Modify the WRED parameter for the high priority queue"). In another implementation, the system may discover the set of required actions related to a given root cause identified thanks to a set of action ai, using reinforcement learning or another suitable approach.

If the root cause identified by troubleshooting agent 502 for issue I is eligible for automated action (e.g., according to a policy), troubleshooting agent 502 may perform any or all of the following:

Troubleshooting agent 502 retrieves the set of action Ai for the root cause of issue I after activating a timer T (max time to solve the issue)

Troubleshooting agent 502 may also employ various optimization criterion may be used for solving a given task T. For instance, troubleshooting agent 502 may solve some tasks with objective metrics such as reducing the processing time or improve accuracy even at the risk of involving more steps and tokens (cost). In the context of the techniques herein, the issue criticality may also drive the optimization criteria (e.g., time versus reliability versus cost). In one implementation, the optimization criteria may be unique and decided according to policy and criticality. In another implementation, troubleshooting agent 502 may trigger multiple actions in parallel, each with different optimization criterion. For example, for a given issue I, troubleshooting agent 502 may send a request to a first LLM with a first criteria (e.g., solve as quickly as possible, optimizing time) and send the same request to a second LLM with different optimization criteria (e.g., efficiency). In such a case, troubleshooting agent 502 may use the reply to the first request (set of resolution action Ai) to quickly fix the network, followed by using the second set of actions to optimize the resolution of the issue. Note that both requests may not overlap in terms of closed-loop actions, as well.

As would be appreciated, while troubleshooting agent 502 may be capable of performing complex troubleshooting tasks and, in some instances, taking automated action to correct issues in the network, its general functionality may also include tasks such as simply monitoring the status or performance of the network, as well as performing configuration changes, even in the absence of an existing issue.

In various implementations, troubleshooting agent 502 may utilize reinforcement learning, to improve its performance over time. To do so, troubleshooting agent 502 may perform network troubleshooting, such as by executing Python code in an iterative manner, collecting observations about the network along the way, and attempting to correctly sequence API calls. At the core troubleshooting agent 502 may be one or more models trained using reinforcement learning, which is/are responsible for picking the best action in a given state.

In such cases, the actions described above may take the form of (Python) functions that take arguments mapped from the observations made so far and return a new observation. By way of example, FIG. 6 illustrates an example action definition 600 written in Python. As shown, each action may have an identifier (e.g., d851ce3057 in definition 600), a name (e.g., get_top_colors_by_bytes), a set of parameters, a domain, and/or description of the resulting observation. Importantly, actions produce observations that may be self-contained, i.e., they contain the parameter values.

Here, observations are facts about the network being troubleshooted, which are accumulated by troubleshooting agent 502 as it executes actions. The state of troubleshooting agent 502 is characterized by the question (i.e., the user's input request) and the observations made so far about the network.

To support reinforcement learning, troubleshooting agent 502 may further be configured as follows:

Actions are constrained: troubleshooting agent 502 is only allowed to perform pre-defined actions, which have been reviewed and curated by experts. However, the generation of these actions is automated, and is part of the learning process. Note that the set of allowed actions may also be governed by task according to a policy.

Sequencing of actions is learned: given a question and a set of observations, the decision as to which action should be executed next is made by a learned policy, which is trained on past questions.

The LLM of troubleshooting agent 502 parses and maps observations to actions: in troubleshooting agent 502, one or more LLMs may also play a secondary role, i.e., parsing the output of actions either to map observations to action arguments or to generate a final answer and handle follow up questions.

Figure 7:
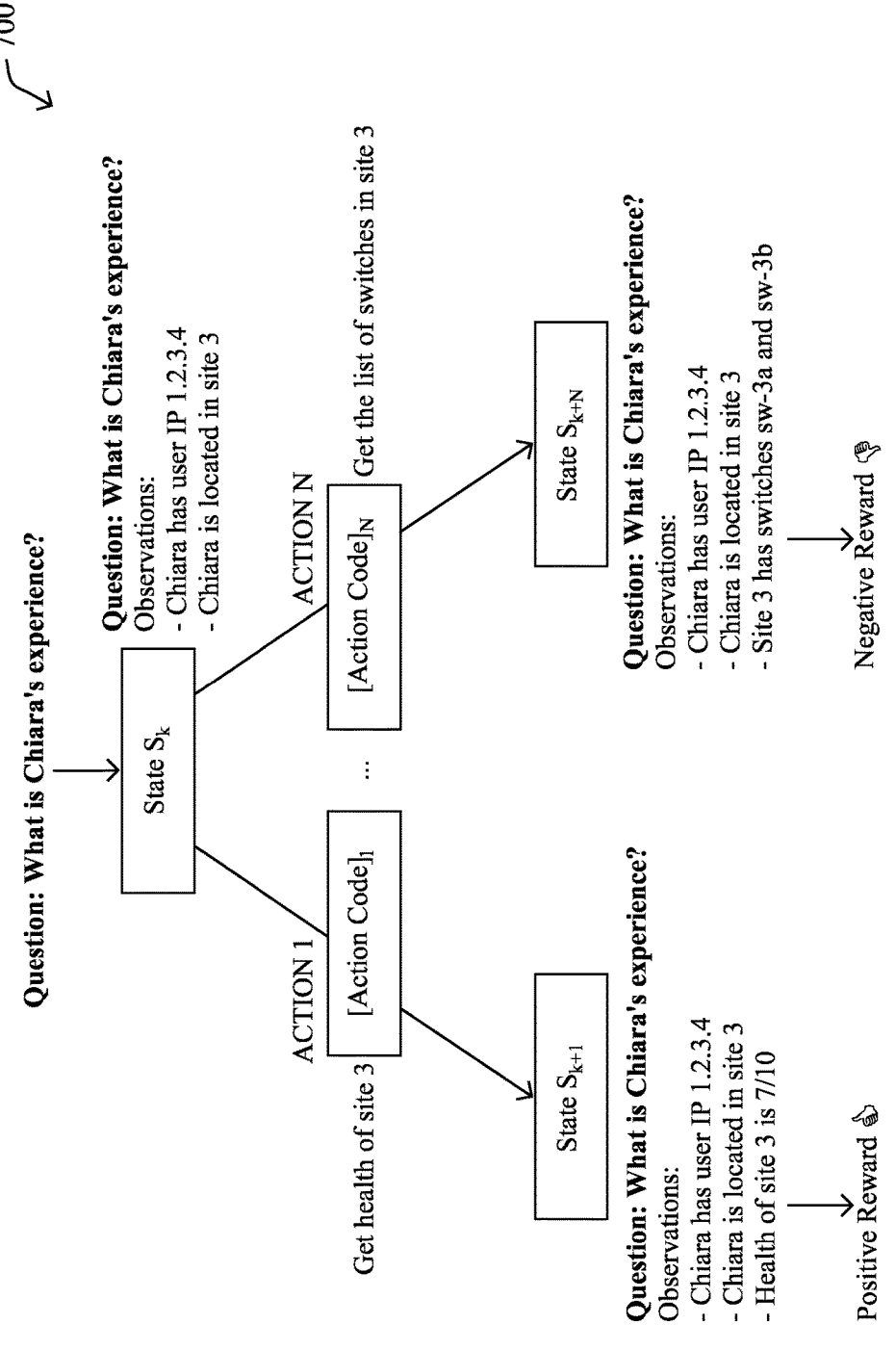
FIG. 7 illustrates an example action tree.

FIG. 7 illustrates an example action tree 700, which represents the sequence of states and actions, ultimately leading to a reward. In general, an effective reinforcement learning strategy builds a so-called policy, which governs which action must be picked by the agent in a given state, so as to maximize the cumulative reward. As shown, the root of an action tree, such as action tree 700 is a question or other troubleshooting task without any observation and each branch is a sequence of the form:

$$\text{trace}_j := s_0^j \to a_0^j \to s_1^j \to \cdots \to a^j$$

where $$s_0^j$$

is a state made of only the question and $a^j$ is the final answer extracted by troubleshooting agent 502 from the set of observations. Based on this answer, the evaluation framework computes a reward, which is used to train troubleshooting agent 502, refine the set of actions, or both.

Figure 8:
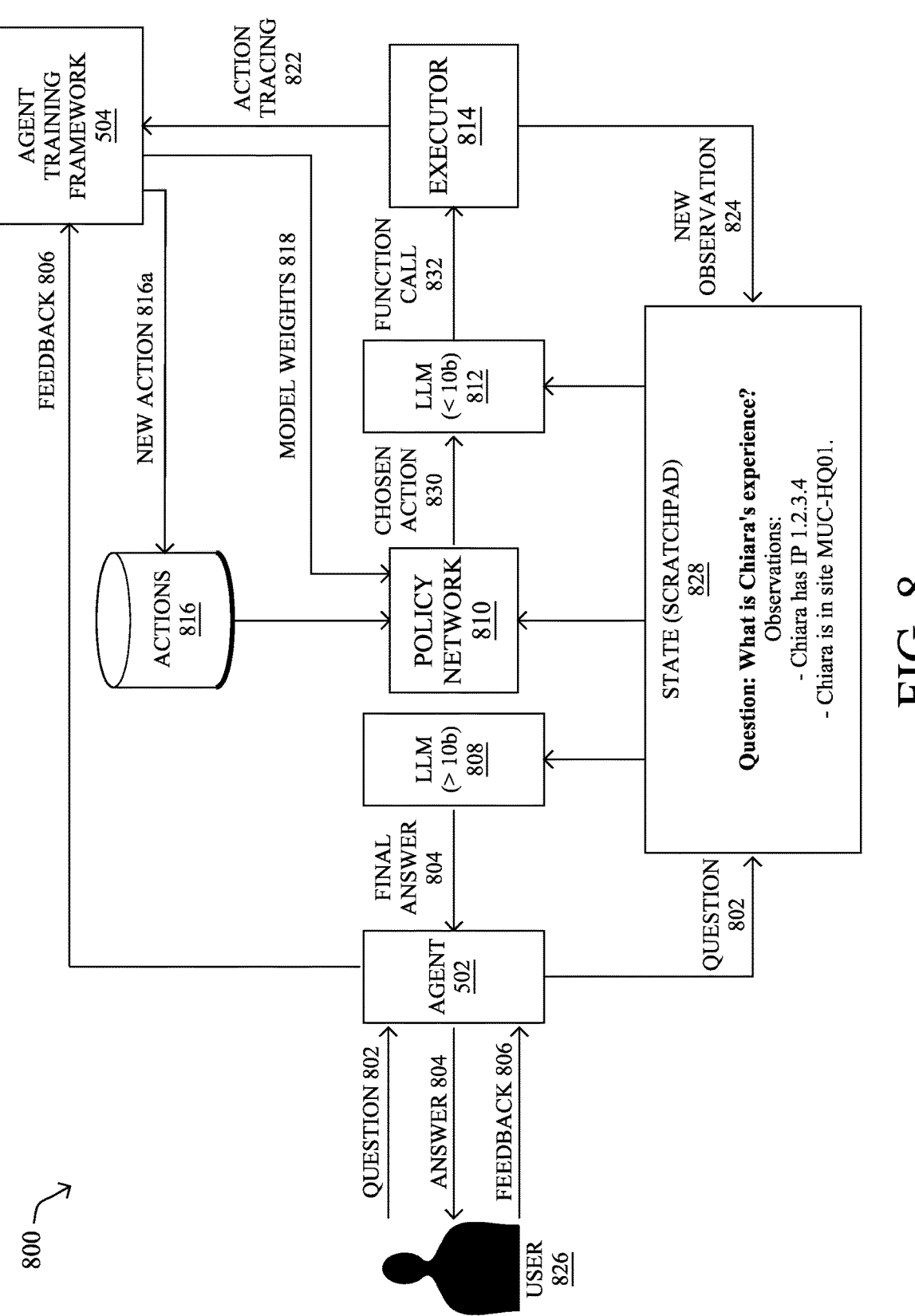
FIG. 8 illustrates an example of the interactions of the components of the architecture in FIG. 5.

FIG. 8 illustrates an example 800 of the interactions of the components of the architecture in FIG. 5, in various implementations. Note that example 800 illustrates one potential deployment scenario whereby troubleshooting agent 502 is deployed on-prem. In such a case, the model(s) of troubleshooting agent 502 are not updated on-premise, but new weights are regularly pushed from the cloud (e.g., the policy is learned by a central engine). The companion LLMs of troubleshooting agent 502 that perform function calls and produce the final answer based on all observations may be updated as well, although this might not be always the case.

As shown, troubleshooting agent 502 may rely on various models, such as LLM 808, responsible for producing the final answer 804 in response to a question 802 (e.g., an input troubleshooting request) from a user 826. In addition, troubleshooting agent 502 may also leverage a policy network 810 that may take the form of a transformer-based model, but non-generative, that selects a given action. Troubleshooting agent 502 may also use an LLM that is smaller than that of LLM 808, LLM 812, to enact the action selected by policy network 810 using an executor 814. Preferably, these models are able to run on-prem without any need to push data to the cloud, except for the usual telemetry used for serviceability purposes. Alternatively, the models can also run in the cloud when an enterprise prefers not to have an on-premise footprint.

More specifically, the workflow may proceed as follows:
1. A user 826 asks a question 802 to troubleshooting agent 502, which adds it to the state 828 (e.g., a scratchpad). For instance, assume that question 802 asks "what's the experience of Chiara?"
2. Policy network 810 takes state 828 as input and chooses the next action to perform from the set of allowed actions 816. Note that some actions may be selected by the learned policy as the ones with highest potential for future reward or totally new (e.g., based on a notion of exploration).
3. LLM 812 is responsible to take the chosen action 830 and produce a valid function call 832 for execution by executor 814.
4. In turn, executor 814 performs the action and the resulting observation 824 is added to the state. For instance, executor 814 may take the form of a Python shell, read-eval-print loop (REPL), that executes the Python code associated with the chosen action 830.
5. The workflow may return to step 2 above and iterate until the system reaches a point where a final answer 804 can be produced.
6. The final answer 804 is then provided back by LLM 808 or review by user 826.

The decision to stop the iteration and produce a final answer may be taken either by policy network 810 itself, which may produce a specific output to denote that the goal has been reached or by LLM 808, which can decide that the set of observations is sufficient to produce a valid answer.

In some implementations, user 826 may also be able to provide feedback 806 on final answer 804, such as by flagging it as factually incorrect or useless. This feedback may be used by agent training framework 504 to i.) further train policy network 810 by issuing new model weights 818 and/or ii.) trigger a review process of the actions performed by troubleshooting agent 502, as they may include a bug or have mismatching description and implementation. In such a case, agent training framework 504 may provide a new action 816a for selection by policy network 810, from this review process.

In general, agent training framework 504 is concerned with the improvement of the performance of troubleshooting agent 502 over time. To this end, agent training framework 504 may include a sub-component, referred to herein as a "troublemaker," that allows agent training framework 504 to generate new scenarios with an explicit reward provided by an evaluation framework that grades the answers of the agent.

Figure 9:
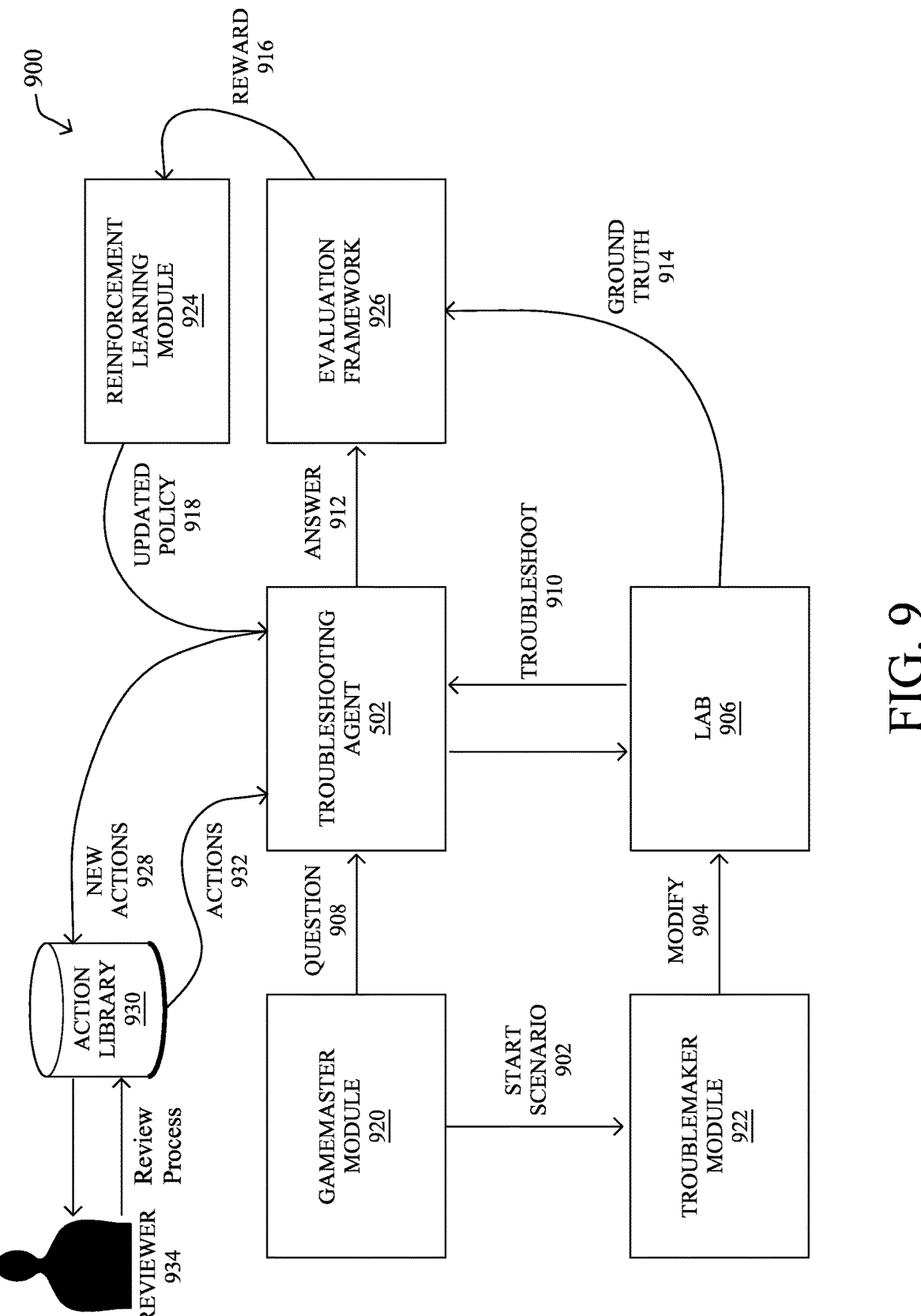
FIG. 9 illustrates an example architecture for an agent training framework.

FIG. 9 illustrates an example architecture for agent training framework 504, in various embodiments. As shown, agent training framework 504 may include various subcomponents, such as a gamemaster module 920, a troublemaker module 922, a reinforcement learning module 924, and/or an evaluation framework 926. As shown, gamemaster module 920 may initiate a game by sending an instruction 902 to troublemaker module 922 to start a new scenario for a new test case.

In turn, troublemaker module 922 may send one or more messages 904 into the network 906, which is preferably a sandbox/lab environment, to instantiate the scenario. Next, gamemaster module 920 may issue a corresponding question 908 to troubleshooting agent 502 regarding the scenario, asking it to perform a task such as troubleshooting the scenario, retrieving certain information that pertains to the scenario, or even devise actions to correct the scenario.

By way of example, troubleshooting agent 502 may perform troubleshooting 910 by interfacing with one or more services or devices in network 906, to generate an answer 912 using its LLM(s), which it provides to evaluation framework 926 for analysis. Similarly, evaluation framework 926 may obtain ground truth information 914 regarding the scenario from network 906 and compare it to answer 912, to determine whether troubleshooting agent 502 was able to successfully address question 908. Based on this comparison, evaluation framework 926 may compute a reward 916 that it provides to reinforcement learning module 924. Based on the computed reward, reinforcement learning module 924 may opt to compute a new updated policy 918 for troubleshooting agent 502 (e.g., of policy network 810), to improve its functionality. In some cases, reinforcement learning module 924 may also provide the reward 916 back to gamemaster module 920 to determine the next game to perform and its difficulty.

More specifically, a game may consist in gamemaster module 920 instructing troublemaker module 922 to perform some (malicious) changes to the network (e.g., a scenario) and asking troubleshooting agent 502 to either 1.) pinpoint the root cause or 2.) fix the issue altogether. Note that a given scenario (e.g., a flapping switch port) can lead to multiple games of increasing difficulty depending on the question asked gamemaster module 920. For instance, in the case of the scenario relating to a flapping switch port, various games related to this scenario may entail asking troubleshooting agent 502 to answer any of the following questions, which increase with difficulty:

Is port X of switch Y flapping?
Which port of switch Y is flapping?
Is there a switch port flapping?
There is a problem with switch Y, which one?

A key factor driving the difficulty of the scenario is the harmfulness of the generated impairment and, therefore, how easy it is to detect. Indeed, gamemaster module 920 may initiate scenarios with minor impairments to the network (e.g., by starting by injecting small error rates, a few link flaps in the network, or on the contrary, very strong impairments such as high rates of link flaps, error rate, node reboots, etc.) and increasing gradually the magnitude of these impairments.

Questions that gamemaster module 920 may send to troubleshooting agent 502 during any game may take any or all of the following:

1. Troubleshooting questions such as:
User X sees packet loss to host 1.2.3.4. Can you determine why?
User X has trouble connecting to Webex. Can you determine why?
2. Requests to perform certain actions such as:
User X is complaining about poor Webex experience. Can you please fix the issue?
3. Requests to perform certain analyses, such as:
Can you provide me the list of all users impacted by the same issue as X?

As would be appreciated, while the input to troubleshooting agent 502 from gamemaster module 920 is generally referred to herein as a "question," any such input may also take the form of a statement or other request and does not necessarily need to be in question form. Thus, as used herein, the term "question" is intended to be encompassing of these alternatives and refer generally to any input request for troubleshooting agent 502 during any given test/game.

In some implementations, troubleshooting agent 502 can also extend a question with hints, providing observations about the network that troubleshooting agent 502 can leverage directly (e.g., user X is connected to device Y, etc.).

As will be appreciated, the same network scenario may be associated with a wide range of games and difficulties. To this end, gamemaster module 920 may use a generative model, as well, to generate the following:

1. Scenario definition: which determines what the Troublemaker must execute. This may, for instance, take the form of a YAML file.

2. The question that the troubleshooting agent must answer.

Both of the above can be generated by gamemaster module 920 using an LLM, for instance, possibly with some generation constraints (e.g., for a YAML file). In some embodiments, gamemaster module 920 may select the scenario definition from a list of pre-defined scenarios. In other embodiments, troubleshooting agent 502 may simply modify pre-defined scenarios (e.g., by changing the circuit or device impacted). In more advanced embodiments, gamemaster module 920 may generate the whole scenario from scratch based on a known set of impairment capabilities of troublemaker module 922.

As part of this learning process, new actions can also be generated for use by troubleshooting agent 502. For instance, a subject matter expert (SME) reviewer 934 may perform a review process with respect to action library 930 and define and/or approve new actions 928 for inclusion in the set of actions 932 allowable by troubleshooting agent 502.

There are two key things that agent training framework 504 can adjust, to improve the performance of troubleshooting agent 502:

The actions which troubleshooting agent 502 can execute.
As noted, these may take the form of a set of Python functions (or in another suitable language) produced either manually by an expert, or automatically by a coding LLM (e.g., WizardCoder, etc.). Regardless of whether they are generated automatically or specified by an SME, the actions may also be subject to some testing, such as by executing them against a real network (e.g., network 906) and validating their output. Furthermore, they may also undergo a peer review process before making their way into the so-called revision of the action set.

The policy which governs which action is executed at each step, which may be a standard LLM prompted to select the next action or another type of model and drives the entire process of troubleshooting.

Multiple strategies can be used to improve the actions, such as the following:

Analyzing the execution traces of troubleshooting agent 502 can uncover faulty actions (e.g., low, or very low success rate of traces that use them, or increased token usage of these traces due to retries).

Cross-validation of their output with similar or correlated actions (e.g., if an action produces the IP address of a device, trying to use this IP address to fetch data about the said device can uncover an issue).

FIGS. 10A-10D illustrate example policy strategies, in various implementations. As would be appreciated, policy network 810 used by troubleshooting agent 502 can have a diverse set of architectures, but it always relies on a transformer-based architecture as its input is, one way or the other, textual.

In one implementation, policy network 810 may use an architecture that relies on an LLM with retrieval augmented generation (RAG). This is the first and simplest strategy that consists in prompting a pre-trained (instruct) model such as GPT-4 or LLaMa2, combined with a RAG strategy, to select the next action. In itself, this is a form of a reinforcement learning policy, which can be, in principle, trained to optimize the cumulative reward like any other strategy. The main benefits of this approach are simplicity, flexibility (prompting only, possibly using few-shot learning such as in-context learning), and explainability (e.g., one can prompt the LLM to explain its choice). On the downside, though, this approach does not support combined end-to-end fine-tuning of the LLM and RAG. There is also no principled way to train this policy using reinforcement learning, as it chooses actions in a greedy fashion, without outputting a score (Q value) or a probability (It).

Figure 10A:
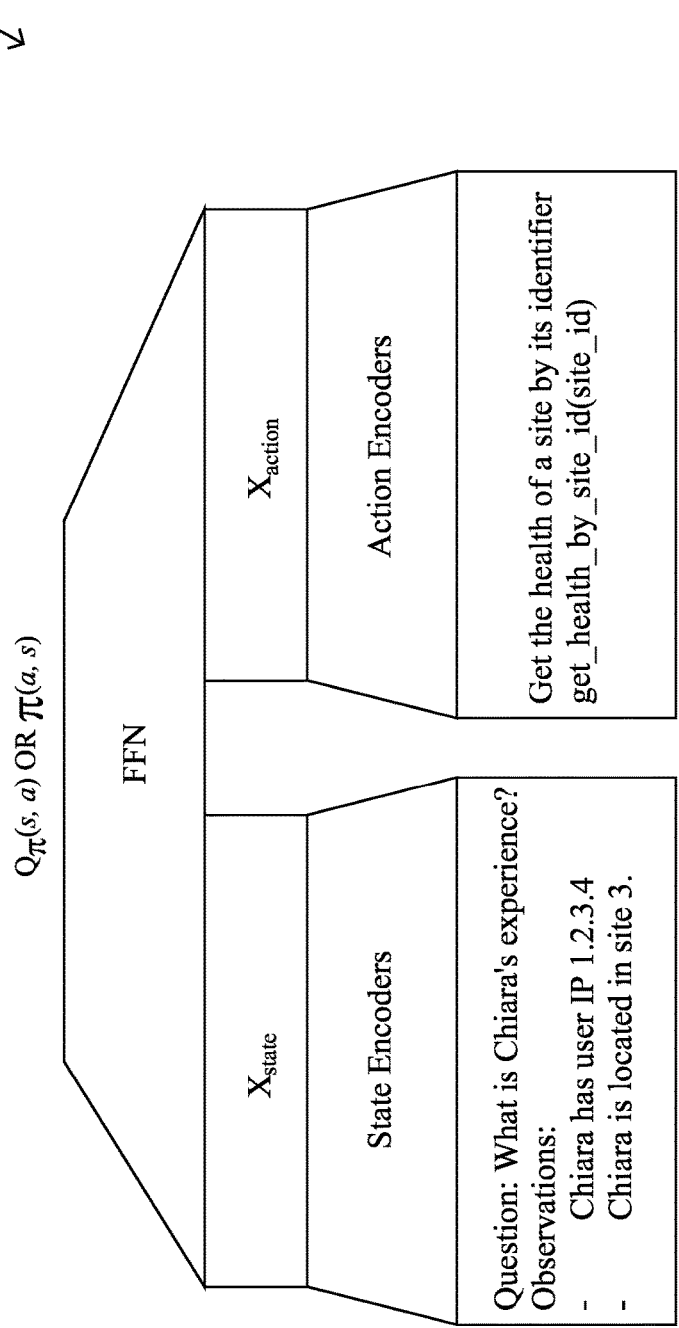

FIG. 10A illustrates a second potential architecture 1000 for policy network 810, which relies on two encoders. In this architecture, both the state and the actions are embedded using two encoder models (e.g., BERT-like) and produce two embeddings xstate and xaction, which can be concatenated and fed to a Feed-forward Neural Network (FNN) responsible for scoring the (action, state) pair. This scoring can either be a Q-value (if trained using Q-learning) or possibly be normalized across all actions using a softmax in order to produce a proper policy $\pi(a, s)$ (e.g., trained using policy gradients or proximal policy optimization). The benefits to this approach are its simplicity, it is lightweight, and is trainable end-to-end. However, encoders also have limited capacity, both in context size and capability, so they are unlikely to capture planning strategies that we require in our use case. There is also limited explainability using this approach and would require a surrogate model.

In another implementation, policy network 810 may use architecture 1010 shown in FIG. 10B, whereby an LLM is used with a corresponding policy. In this approach, the LLM computes the likelihood of each action directly, token by token. The main benefits of this is its conceptual simplicity and it is trainable end-to-end. However, there is also a higher inference cost, limited explainability, and the potential for a conceptual mismatch between a sequence probability and the intent. For instance, the action 'Get the IP address (e.g., 127.1.2.3) of a switch in DNAC' might be assigned a lower probability than 'Get the MAC address of a switch in DNAC,' although the intent was indeed to get the MAC address, because the probability of the tokens in the chain '127.1.2.3' is very low.

Figure 10C:
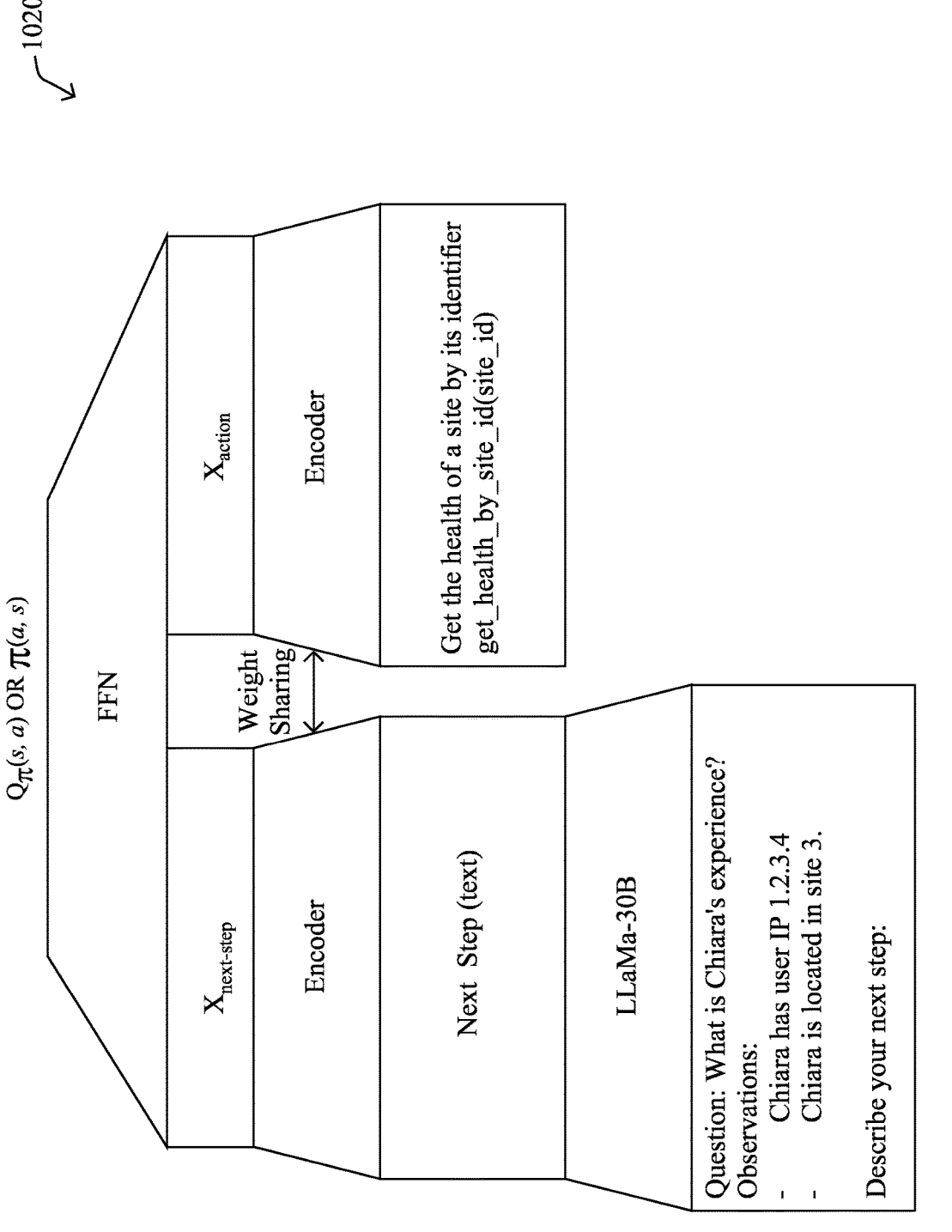

FIG. 10C illustrates another example architecture 1020 for policy network 810 that leverages both encoders and an LLM, in another implementation. This architecture is somewhat like the LLM+RAG one above, but instead of providing the candidate actions in the prompt and asking the LLM to choose one. The system scores the embeddings of (next_action, action), whereby next_action is generated by the LLM and embedded using the same model as the actions. The main benefits of this approach is that each model can be trained separately and the flexibility to adjust the prompt of the LLM for increased performance. However, this approach also does not afford end-to-end fine-tuning (we would need to differentiate through the decoding loop), but an ability to train a feed-forward neural network (FFN) using reinforcement learning. In addition, it is possible that this approach could provide limited explainability, although explainability may still be possible by extracting a subset of the model output to build next_action.

Figure 10D:
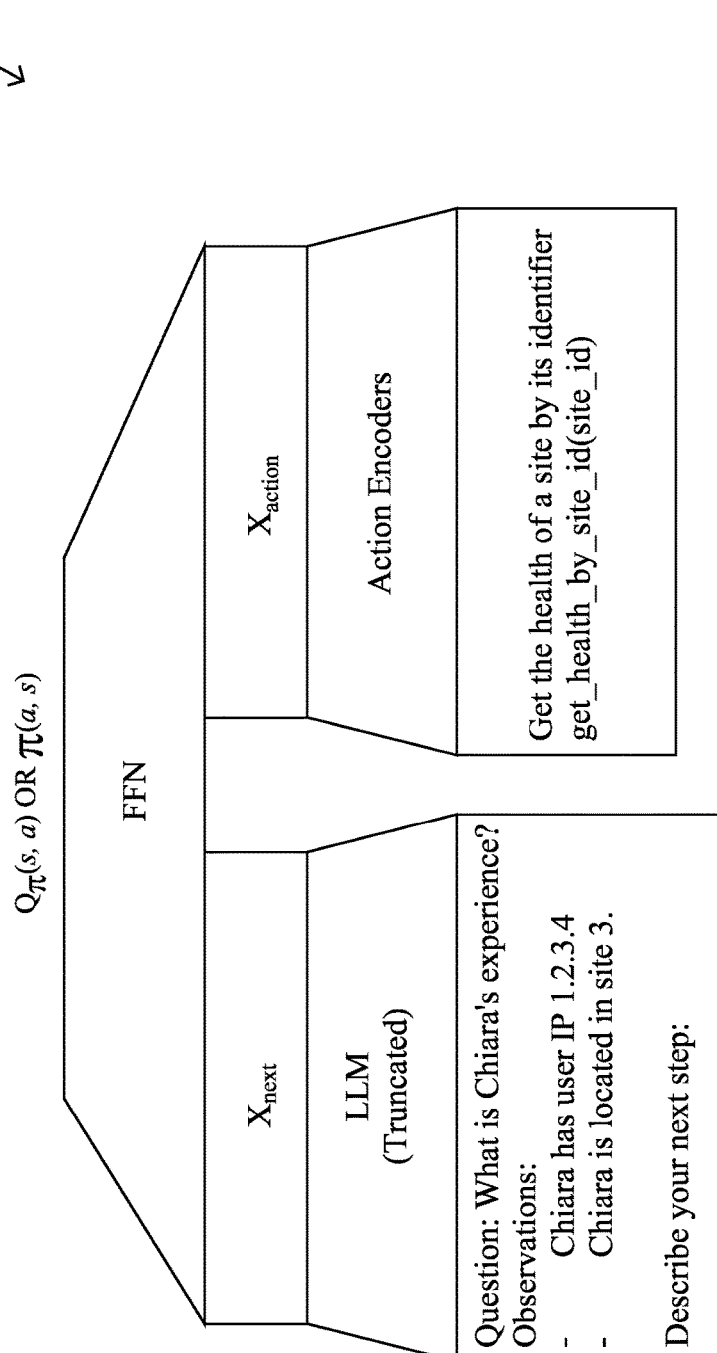

In another implementation, FIG. 10D illustrates an example architecture 1030, which is a step towards using an LLM as a General Pattern Machine. The idea here is to use an LLM to produce an embedding instead of a token and score the pair (xstate, xaction) using an FFN, which would essentially 'match' the embedding produced by the LLM, which represents a latent intent, with an action. This approach affords end-to-end training, both on demonstrations and using reinforcement learning. It also affords high inference speeds (the LLM produces only one "token") and flexibility to adjust the prompt of the LLM. However, this approach also entails more complex training, needs adaption of an off-the-shelf model, and offers limited explainability (need for a surrogate model).

With respect to collecting rewards and training the policy, agent training framework 504 may perform the training in two distinct phases, like AlphaGo:

Supervised pre-training: here, agent training framework 504 may first collect traces from previous runs that were successful. These traces consist of (action, state) pairs with a known 'value':

Implicit value: here, the system may assume that pairs chosen by a reliable source (i.e. a very capable model from which we can perform distillation or an expert) have an intrinsic value.

Explicit value: here, the system may ask troubleshooting agent 502 to rate its choice a posteriori, given the observation that it collected. The system may also factor in at this point the eventual reward, i.e., whether the chain produced the correct answer.

Agent training framework 504 then fine-tunes the policy based on such pairs. The training strategy may differ depending on the architecture, but it always consists in performing some form of loss backpropagation.

Reinforcement learning: given a pre-trained policy, agent training framework 504 then executes troubleshooting agent 502 on a vast number of "games" set up by gamemaster module 920 and troublemaker module 922, and collects the reward R. Each game can also be executed multiple times, sampling different actions from the policy or from the large language models used to trigger function calls and to produce the final answer, allowing for more exploration. The value of R can either be binary (success or failure) or a score that is proportional to how accurate or useful the answer is. Then, agent training framework 504 may update the policy by using an appropriate algorithm, such as any of the following:

Policy-based (e.g., Proximal Policy Optimization (PPO))—if the model produces a direct policy, i.e., a probability distribution over the actions.

Value-based (e.g., Q-Learning)-if the model produces a score, which leads to a policy by choosing the action of maximal value.

Actor-Critic methods use a combination of both strategies, but they require two models: i.) a policy network, called the Actor, which produces a probability distribution, and ii.) a value network, called the Critic, evaluates the actions chosen by the Actor. The Actor is trained based on the estimates provided by the Critic, which, in turn, is trained using actual rewards from the environment. This strategy can help stabilizing the learning process of both networks, as well as learn to take better actions in different states.

Figure 11:
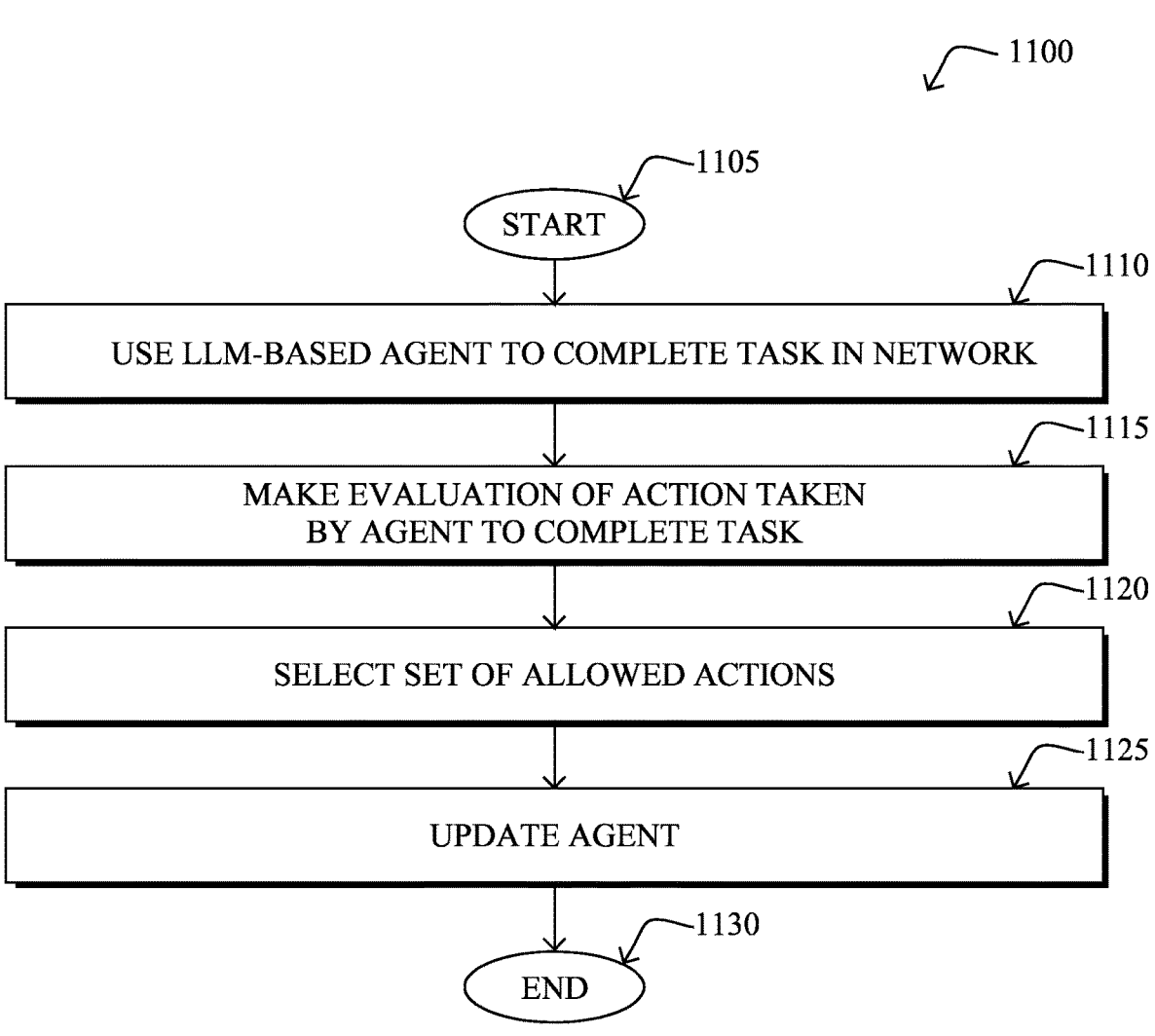
FIG. 11 illustrates an example simplified procedure for teaching an LLM-based agent to troubleshoot networks using reinforcement learning.

FIG. 11 illustrates an example simplified procedure (e.g., a method) for teaching an LLM-based agent to troubleshoot networks using reinforcement learning, in accordance with one or more implementations described herein. For example, a non-generic, specifically configured device (e.g., device 200), such as a router, firewall, controller for a network (e.g., an SDN controller or other device in communication therewith), server, or the like, may perform procedure 1100 by executing stored instructions (e.g., language model process 249 and/or network control process 248). The procedure 1100 may start at step 1105, and continues to step 1110, where, as described in greater detail above, the device may use a large language model-based agent to complete a task with respect to a computer network. In various implementations, the task comprises troubleshooting an issue in the computer network. In some cases, the large language model-based agent completes the task by interfacing with an application programming interface (API) of a controller for the computer network. In one implementation, the large language model-based agent uses a transformer-based policy network to select the action taken by the large language model-based agent to complete the task. In various implementations, the large language model-based agent uses a first large language model to answer a question regarding the task and a second large language model to perform the action. In some cases, the second large language model smaller in size than that of the first large language model.

At step 1115, as detailed above, the device may make an evaluation of an action taken by the large language model-based agent to complete the task. In some implementations, the device makes the evaluation of the action by asking a copy of the large language model-based agent to perform the task in a test network.

At step 1120, the device may select, based in part on the evaluation, a set of allowed actions that the large language model-based agent is allowed to perform to complete the task, as described in greater detail above. In some implementations, the device selects the set of allowed actions based in part on user feedback regarding whether an output of the large language model-based agent from the task was satisfactory. In various implementations, the set of allowed actions comprises an action specified by a subject matter expert via a user interface.

At step 1125, as detailed above, the device may update the large language model-based agent with an indication of the set of allowed actions that it is allowed to perform to complete the task. In some cases, the device updates the transformer-based policy network of the agent with the set of allowed actions.

Procedure 1100 then ends at step 1130.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for teaching an LLM-based agent to troubleshoot networks using reinforcement learning, it is to be understood that various other adaptations and modifications may be made within the spirit and scope of the implementations herein. For example, while certain implementations are described herein with respect to using certain models for purposes of generating CLI commands, making API calls, charting a network, and the like, the models are not limited as such and may be used for other types of predictions, in other implementations. In addition, while certain protocols are shown, other suitable protocols may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method comprising:
causing a test environment to simulate a scenario related to an impairment with a computer network;
determining, based at least in part on the test environment, ground truth information associated with the impairment;
using, by a device, a large language model-based agent to complete a task related to the scenario;
making, by the device and based at least in part on the ground truth information, an evaluation of an action taken by the large language model-based agent to complete the task;
selecting, by the device and based in part on the evaluation, a set of allowed actions that the large language model-based agent is allowed to perform to complete the task; and
updating, by the device, the large language model-based agent with an indication of the set of allowed actions that it is allowed to perform to complete the task.

2. The method as in claim 1, wherein the task comprises troubleshooting an issue in the computer network.

3. The method as in claim 1, wherein the large language model-based agent completes the task by interfacing with an application programming interface (API) of a controller for the computer network.

4. The method as in claim 1, wherein the device selects the set of allowed actions based in part on user feedback regarding whether an output of the large language model-based agent from the task was satisfactory.

5. The method as in claim 1, wherein the large language model-based agent uses a transformer-based policy network to select the action taken by the large language model-based agent to complete the task.

6. The method as in claim 5, wherein the device updates the transformer-based policy network with the set of allowed actions.

7. The method as in claim 1, wherein the set of allowed actions comprises an action specified by a subject matter expert via a user interface.

8. The method as in claim 1, wherein the causing the test environment to simulate the scenario includes using a copy of the large language model-based agent to perform the task.

9. The method as in claim 1, wherein the large language model-based agent uses a first large language model to answer a question regarding the task and a second large language model to perform the action.

10. The method as in claim 9, wherein the second large language model smaller in size than that of the first large language model.

11. An apparatus, comprising:
one or more network interfaces;
a processor coupled to the one or more network interfaces; and
a memory configured to store one or more instructions that, when executed by the processor, configure the processor to:
cause a test environment to simulate a scenario related to an impairment with a computer network;

identify, based at least in part on the test environment, ground truth information associated with the impairment;

use a large language model-based agent to complete a task related to the scenario;

make, based at least in part on the ground truth information, an evaluation of an action taken by the large language model-based agent to complete the task;

select, based in part on the evaluation, a set of allowed actions that the large language model-based agent is allowed to perform to complete the task; and update the large language model-based agent with an indication of the set of allowed actions that it is allowed to perform to complete the task.

12. The apparatus as in claim 11, wherein the task comprises troubleshooting an issue in the computer network.

13. The apparatus as in claim 11, wherein the large language model-based agent completes the task by interfacing with an application programming interface (API) of a controller for the computer network.

14. The apparatus as in claim 11, wherein the apparatus selects the set of allowed actions based in part on user feedback regarding whether an output of the large language model-based agent from the task was satisfactory.

15. The apparatus as in claim 11, wherein the large language model-based agent uses a transformer-based policy network to select the action taken by the large language model-based agent to complete the task.

16. The apparatus as in claim 15, wherein the apparatus updates the transformer-based policy network with the set of allowed actions.

17. The apparatus as in claim 11, wherein the set of allowed actions comprises an action specified by a subject matter expert via a user interface.

18. The apparatus as in claim 11, wherein the processor is configured to cause the test environment to simulate the scenario includes by using a copy of the large language model-based agent to perform the task.

19. The apparatus as in claim 11, wherein the large language model-based agent uses a first large language model to answer a question regarding the task and a second large language model to perform the action.

20. A tangible, non-transitory, computer-readable medium storing program instructions that cause a device to execute a process comprising:

causing a test environment to simulate a scenario related to an impairment with a computer network;

determining, based at least in part on the test environment, ground truth information associated with the impairment;

using, by the device, a large language model-based agent to complete a task related to the scenario;

making, by the device and based at least in part on the ground truth information, an evaluation of an action taken by the large language model-based agent to complete the task;

selecting, by the device and based in part on the evaluation, a set of allowed actions that the large language model-based agent is allowed to perform to complete the task; and updating, by the device, the large language model-based agent with an indication of the set of allowed actions that it is allowed to perform to complete the task.

\* \* \* \* \*